United States Patent [19]

Kurihara et al.

[11] 4,426,641

[45] Jan. 17, 1984

[54] METHOD AND APPARATUS FOR MONITORING THE SHAFT VIBRATION OF A ROTARY MACHINE

[75] Inventors: Nobuo Kurihara; Yasuo Morooka; Mitsuyo Nishikawa; Kiyoshi Miura; Yoshitoshi Nagahashi, all of Ibaraki, Japan

[73] Assignee: Hitachi, Ltd., Tokyo, Japan

[21] Appl. No.: 249,469

[22] Filed: Mar. 31, 1981

[30] Foreign Application Priority Data

Mar. 31, 1980 [JP] Japan .................................. 55-43040
Nov. 7, 1980 [JP] Japan ................................ 55-155988

[51] Int. Cl.³ .............................................. G08B 23/00
[52] U.S. Cl. ..................................... 340/683; 73/660; 340/681; 364/179; 364/508
[58] Field of Search ...................... 340/681, 682, 683; 364/178, 179, 508, 576; 73/579, 583, 593, 659, 660

[56] References Cited

U.S. PATENT DOCUMENTS

| Re. 30,298 | 6/1980 | Keller ............................... 340/683 X |
|---|---|---|
| 3,681,978 | 8/1972 | Mathias et al. ........................ 73/660 |
| 3,733,892 | 5/1973 | Rennick ............................ 73/660 X |
| 3,758,758 | 9/1973 | Games et al. .................. 340/683 X |
| 4,302,813 | 11/1981 | Kurihara et al. ..................... 364/508 |
| 4,352,293 | 10/1982 | Kurihara et al. ..................... 364/508 |

*Primary Examiner*—Glen R. Swann, III
*Attorney, Agent, or Firm*—Antonelli, Terry & Wands

[57] ABSTRACT

From the viewpoint of the preventive maintenance operation of a rotary machine, it is a very important subject to monitor the shaft vibration of the rotary machine and grasp the operating state of the machine. This invention relates to input processings in the case of executing the frequency analysis of a shaft vibration signal by digital processings.

This invention describes the rotational frequency synchronization of a sampling frequency, the phase synchronization of the rotary machine to a reference phase, the relationship between an analytical wave number and a sample nunber, etc. in that case.

8 Claims, 52 Drawing Figures

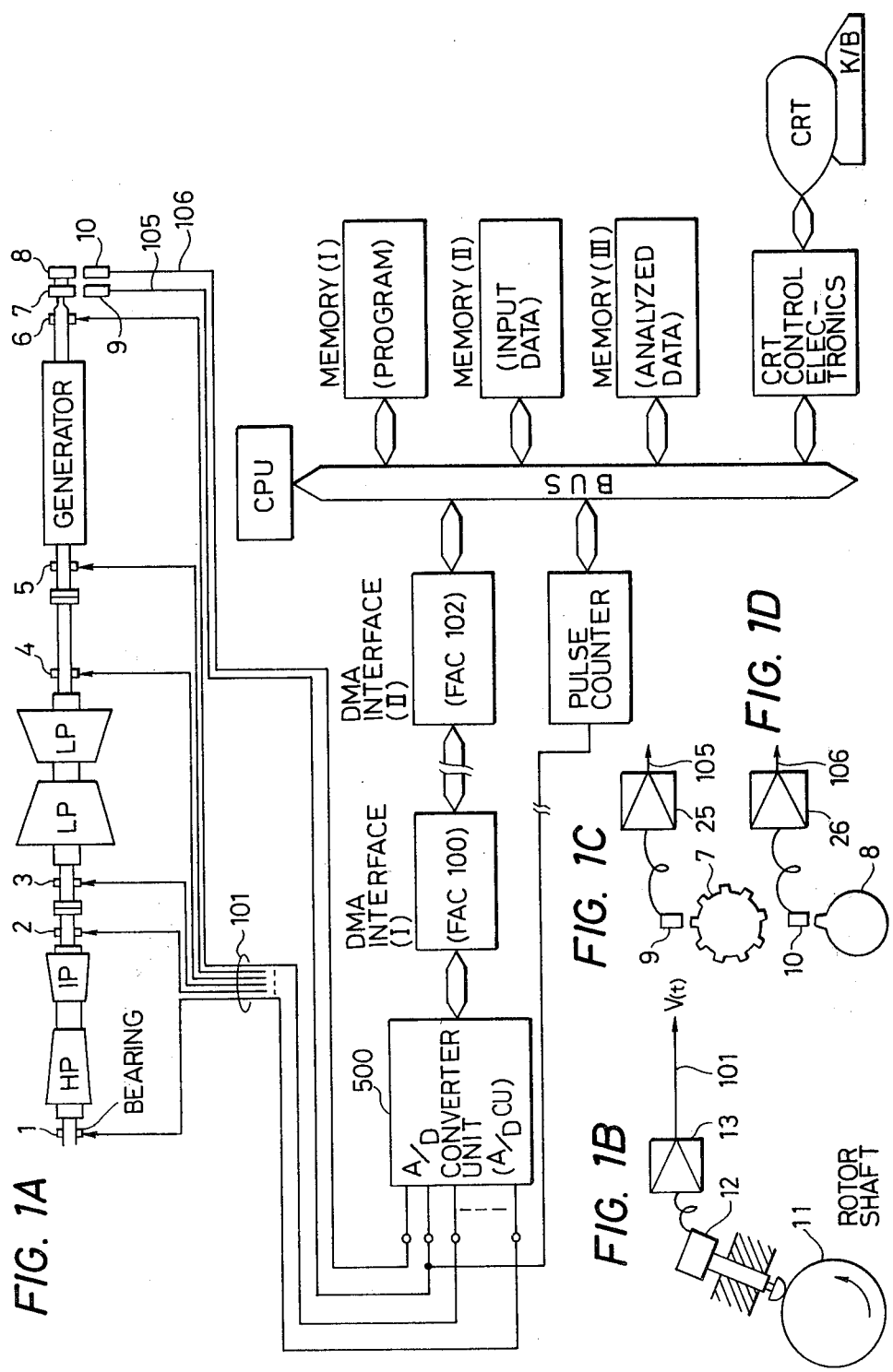

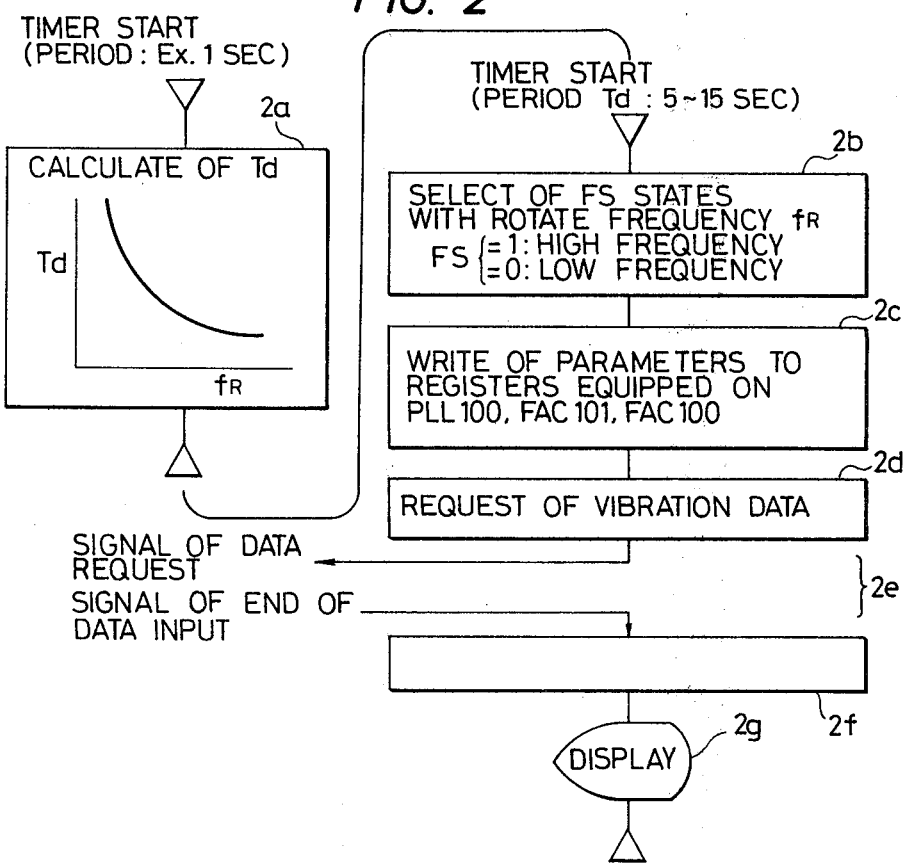
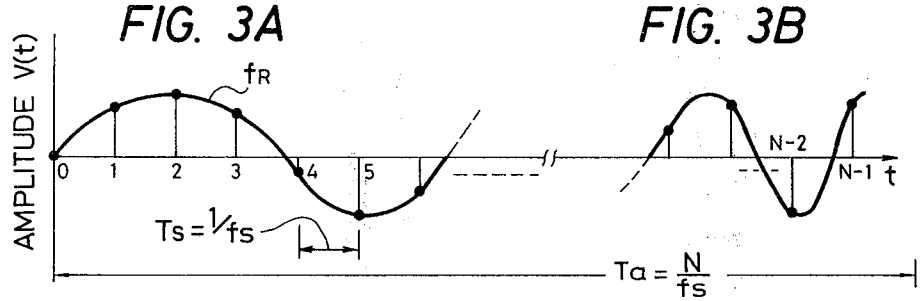
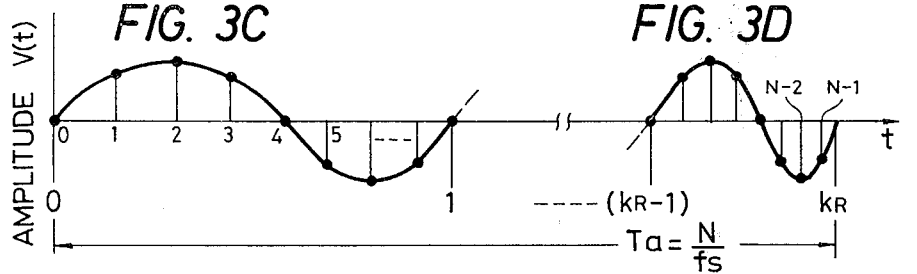

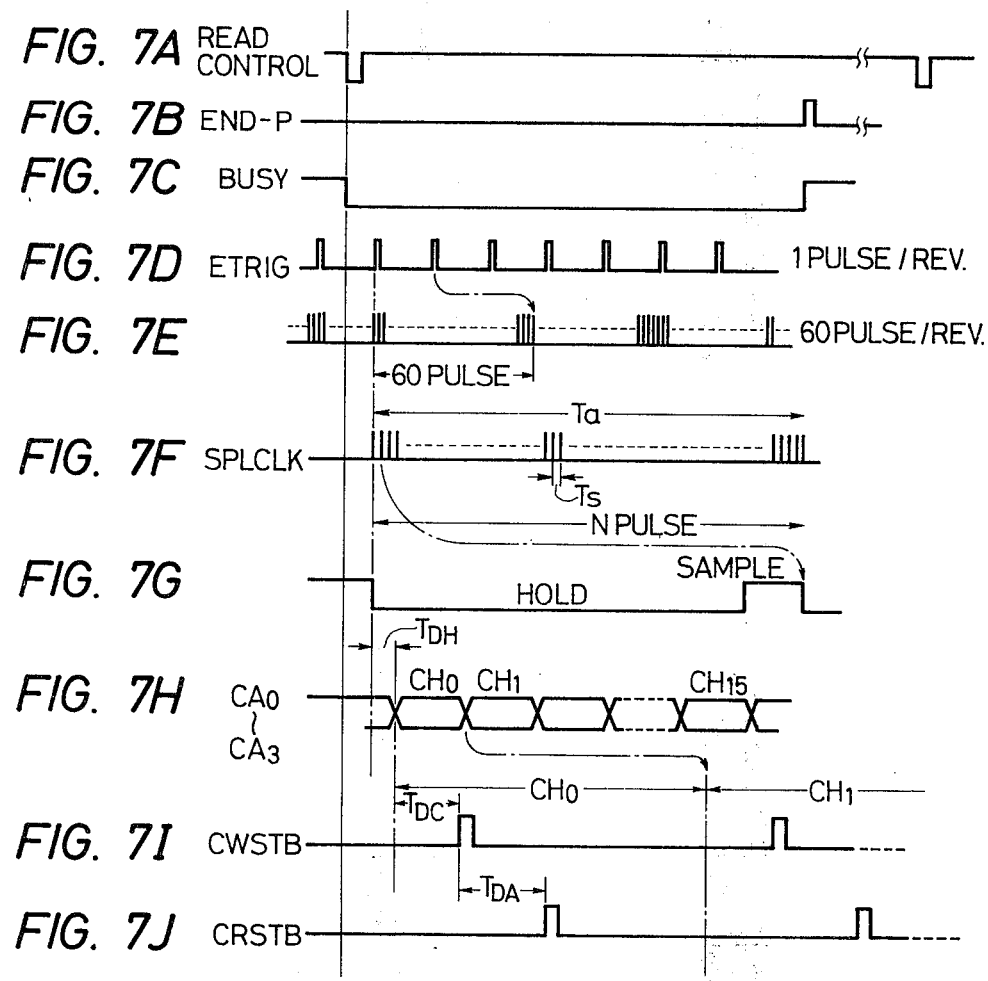

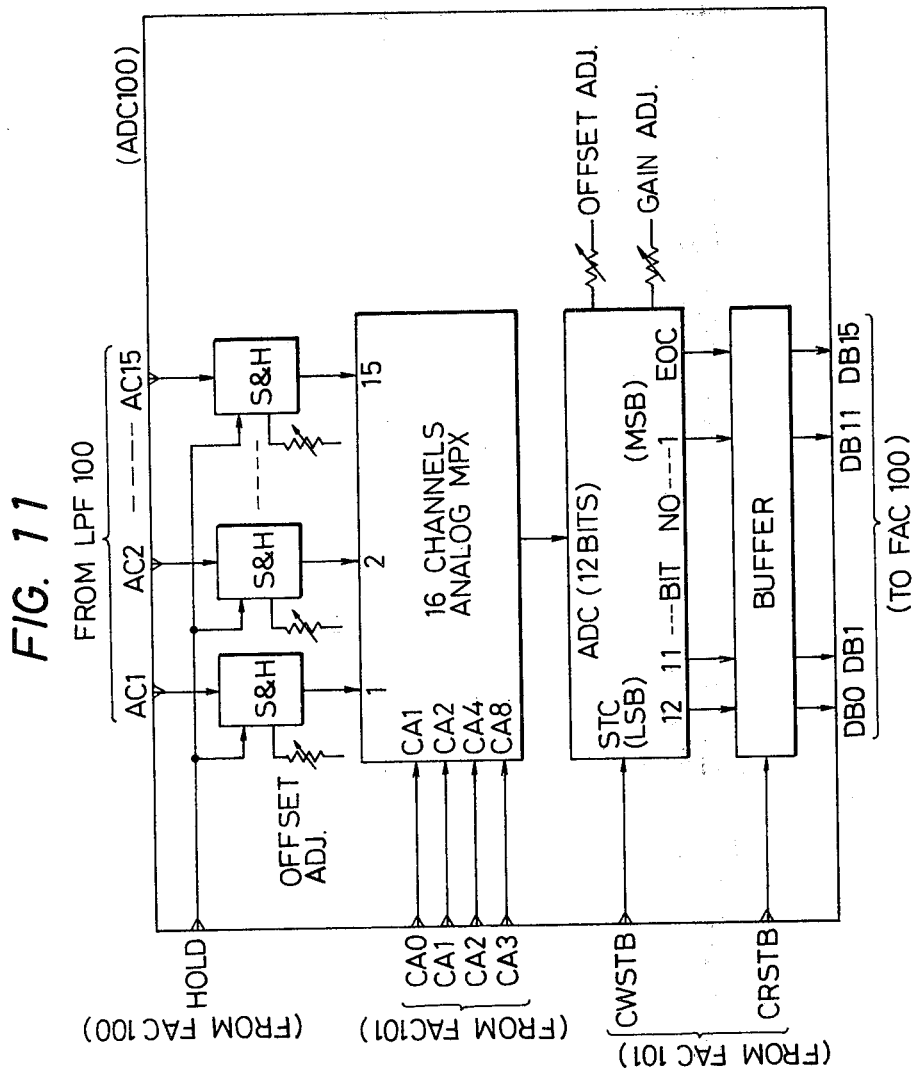

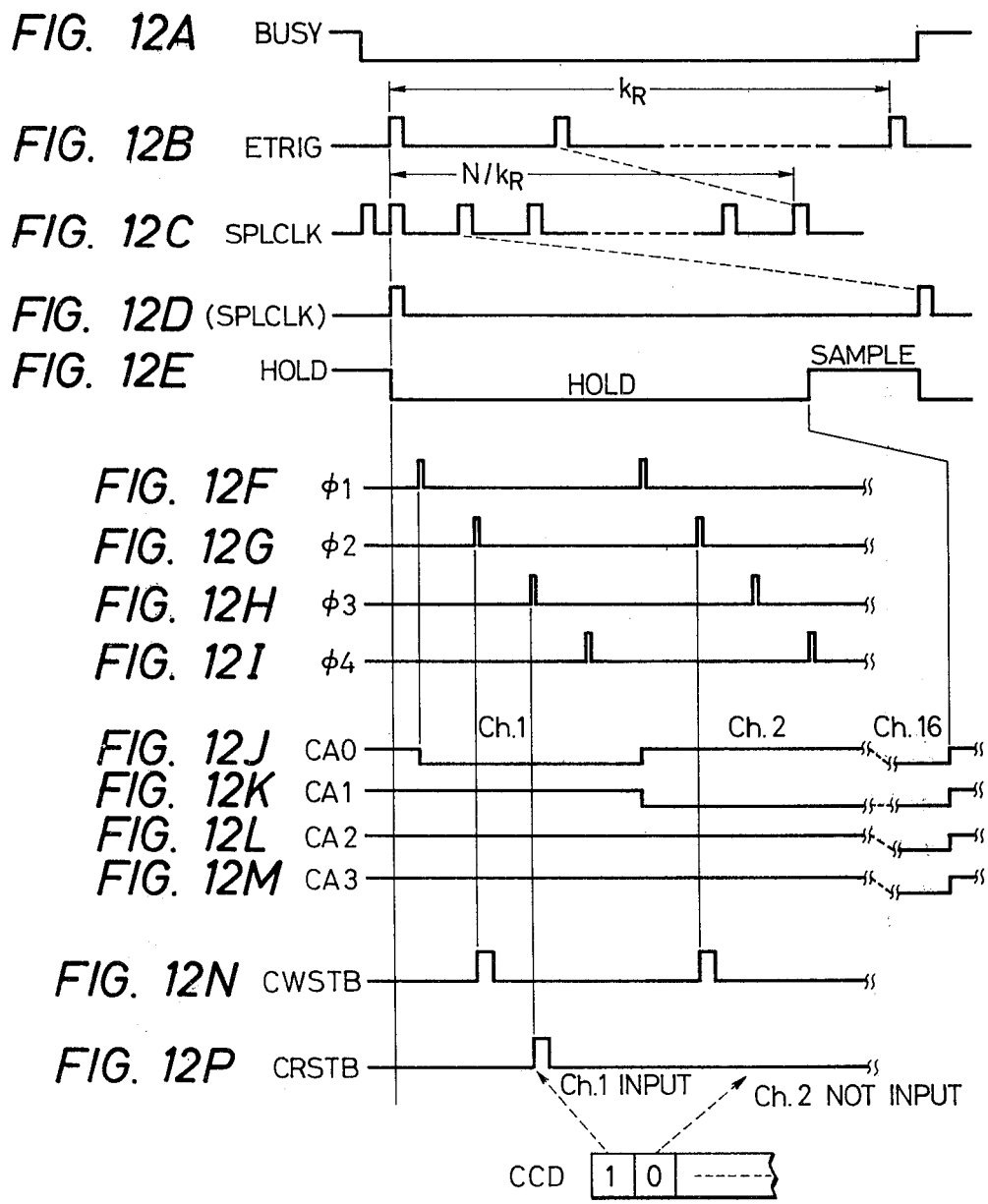

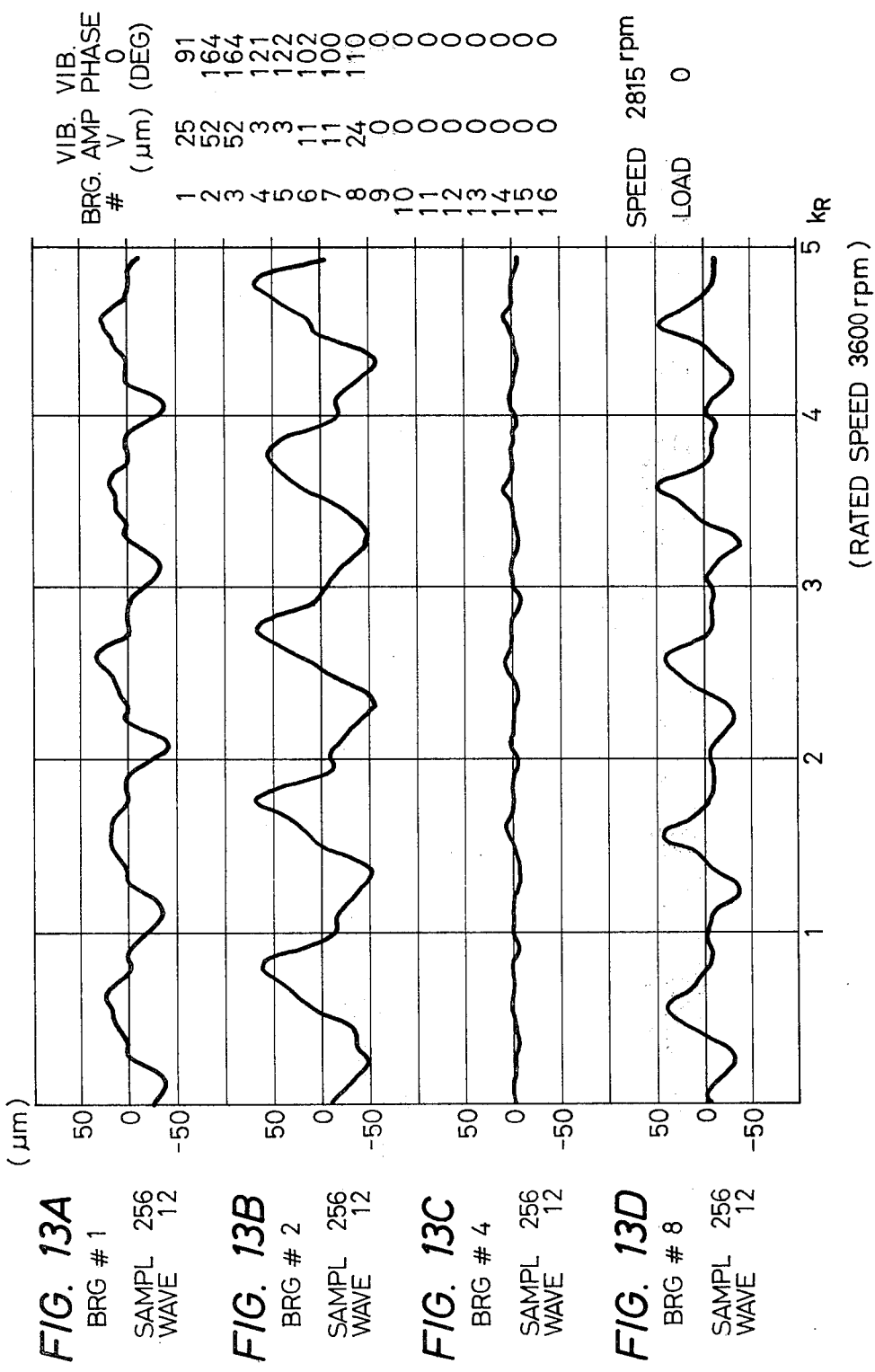

METHOD AND APPARATUS FOR MONITORING THE SHAFT VIBRATION OF A ROTARY MACHINE

BACKGROUND OF THE INVENTION

1. Field of the Invention

This invention relates to the analysis of a shaft vibration signal which arises in a large-sized rotary machine such as steam turbine and generator in a thermal or nuclear power plant. More particularly, it relates to a method and apparatus for monitoring the shaft vibration of a rotary machine wherein a shaft vibration signal developing during operation is analyzed in real time so as to clear up the cause of the shaft vibration.

As the capacities of rotary machines have become large, the shaft vibrations of the rotary machines have become an important subject in the operation maintenance. In a large-capacity steam turbine, the so-called shaft vibration phenomenon has come to present more and more complicated aspects on account of an increase in the weight of a rotor, an increase in the distance between the centers of bearings, and increases in the number of wheel chambers, etc. Recently, the start and stop of the turbine are frequently made. Therefore, abnormal vibrations attributed to a thermal unbalance etc. are more liable to occur that in case of continuing the operation under the steady state.

It is at the starting that an operator concentrates attention most. The disposal of the abnormal vibration at this time needs to be properly made so as not to lose the timing. Of course, the vibration monitoring in the steady state cannot be treated lightly.

Since a high precision and a high-speed processing are required of such analysis and monitoring of a shaft vibration signal, it is favorable to process the signal digitally and monitor the shaft vibration state.

This invention concerns a method and apparatus for loading data while automatically adjusting a sampling period in the case of analyzing the shaft vibration signal with a digital technique, in order to analyze at high speed and at high precision a rotational frequency component and fractional harmonic components or higher harmonic components thereof or a frequency component relating to a natural frequency.

2. Description of the Prior Art

The commonest expedient for monitoring the shaft vibration of a rotary member is a method in which the vibration amplitude of a detected shaft vibration signal itself is monitored. Since, however, the vibration of a certain specific frequency component due to the cause of abnormality, the monitoring of the vibration amplitude of the detected signal itself leads to the disadvantage that an appropriate monitoring of the shaft vibration is impossible.

On the other hand, a method in which a vibrational waveform is subjected to a Fourier analysis and grasped as a power spectrum is disclosed in U.S. Pat. No. 3,694,637 (Sept. 26, 1972, Method and Apparatus for Detecting Tool Wear). However, this method decides the time of the exchange of a tool by the comparison of the power spectrum with a reference power spectrum, and merely a digitized signal for the Fourier analysis is shown in FIG. 2 of the patent specification.

U.S. Pat. No. 3,641,550 (Feb. 8, 1972, Vibration-Monitoring Systems) teaches a vibration monitoring system for a gas turbine engine in the case of 3 shafts. Although the exchange of filters is disclosed, analog signal processings are performed to the last.

In Japanese Laid-open Patent Application No. 54-111871 filed by the same applicant (Japanese Patent Application No. 53-18486, laid open Sept. 1, 1979), a detected shaft vibration signal is analyzed on a frequency component which is in a predetermined relationship with a rotational frequency component, and the operation control of a rotary machine is made in accordance with a predetermined operation pattern on the basis of the analyzed result. Herein, however, the operation control under the assumption that the digital analytical result has been obtained is stated, and no reference is made to the loading of digitized data, that is, the relations between a sampling frequency and a rotational frequency or fractional harmonic components, etc.

This invention consists, in the loading of digitized data, in that the data are loaded with the smallest possible number of samples, and that even when the rotational frequency has fluctuated, the sampling frequency is automatically adjusted while holding an analytical precision, whereupon the analytical data are received. This measure is a very important one indispensable to the digital analysis.

SUMMARY OF THE INVENTION

The principal object of this invention is to execute the analysis of a shaft vibration signal waveform detected at an arbitrary rotational frequency and under predetermined conditions.

Another object of this invention is to execute a sampling which is suited to the digital frequency analysis of a detected shaft vibration signal.

Another object of this invention is to provide a method and apparatus which automatically and optimally select sampling timings in the case of sampling a detected shaft vibration signal.

A feature of this invention consists in automatically adjusting the sampling period of a vibration signal so as to permit a rotational frequency component and fractional harmonic components or higher harmonic components thereof to be analyzed at high precision, with note taken of the fact that many of vibration signals detected as shaft vibrations depend upon the rotational period of a rotary machine.

Another feature of this invention consists in automatically adjusting the sampling period of a vibration signal in accordance with a rotational period so that the sampling number per rotational period may become a predetermined value irrespective of the rotational period.

Another feature of this invention consists in sampling data at a sampling frequency which is determined by the relationship among a rotational pulse frequency serving as a rotational reference signal, an analytical sample number, and an analytical wave number.

Another feature of this invention consists in an analytical frequency synchronization system in which quite identical data are obtained as sampling data in respective diagnostic periods unless the state of a shaft vibration changes.

Another feature of this invention consists in determining a sampling frequency by the so-called internal synchronization system which determines the sampling frequency so that a critical vibration frequency inherent to the structure of a rotary machine or a frequency component lying in a predetermined relationship with the critical vibration frequency may be analyzable irrespective of a rotational frequency.

Another feature of this invention consists in a phase synchronization system in which a shaft vibration waveform can be sampled in synchronism with the reference phase of a rotary shaft even when it has undergone a deviation from the rotational phase of the rotary shaft.

BRIEF DESCRIPTION OF THE DRAWINGS

FIG. 1A shows the general construction of a frequency analyzing system to which this invention is directed.

FIG. 1B shows an example of a shaft vibration transducer, while FIG. 1C shows an example of a rotational pulse signal generator and FIG. 1D shows an example of a phase reference pulse signal generator.

FIG. 2 shows the processing flow of a frequency analysis.

FIGS. 3A to 3D make comparisons between this invention and a prior art in the relationship of a shaft vibration signal waveform and a sampling frequency.

FIGS. 7A to 7J show a time chart for explaining the relationship among the timings of a sampling clock signal etc.

FIG. 11 shows a block diagram of an analog-to-digital converter circuit module.

FIGS. 12A to 12N and 12P show a time chart for explaining the operations of a timing control circuit and a multiplexer.

FIGS. 13A to 13D show an example of the input result of a vibration signal waveform.

DESCRIPTION OF THE PREFERRED EMBODIMENTS

DETAILED DESCRIPTION OF THE INVENTION

Figure 4:
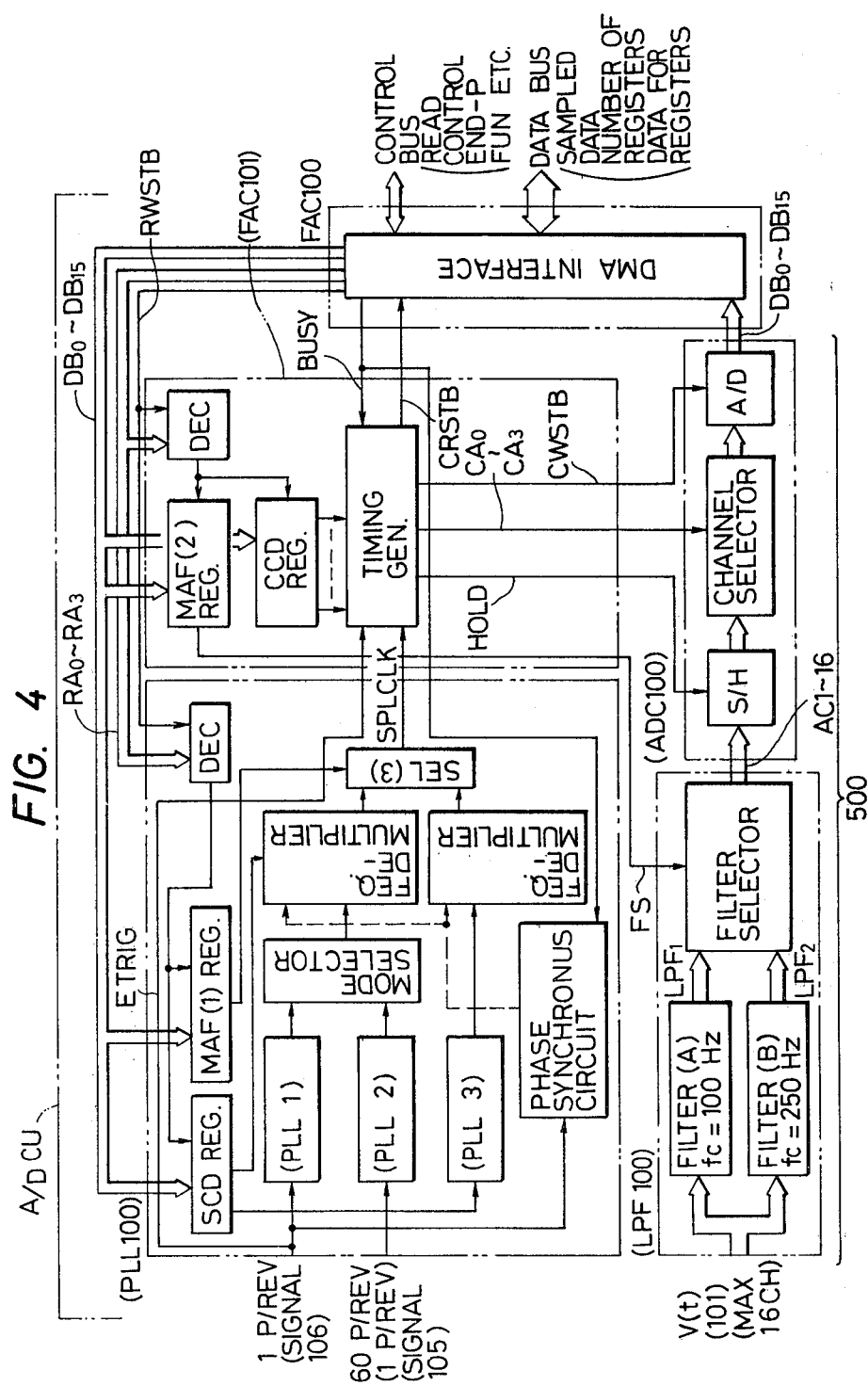
FIG. 4 is a diagram showing the schematic arrangement of an analog-to-digital converter unit.

First, the fundamentals of this invention will be described (with reference to FIG. 1, and Table 1 for briefly explaining principal symbols).

FIG. 1A shows the general construction of a diagnostic system which is based on the frequency analysis of shaft vibration signals to be handled in this invention. Numerals 1 to 6 designate bearing parts, which bear rotary parts. HP indicates a high-pressure turbine, IP an intermediate-pressure turbine, and LP a low-pressure turbine. As shown in FIG. 1B, a vibration transducer 12 is mounted on each bearing, and a shaft vibration signal 101 is provided through an amplifier 13. In FIG. 1B, numeral 11 indicates a rotor shaft. Numeral 7 indicates a rotary pulse gear directly coupled with the rotary shaft, and numeral 9 an electromagnetic pickup. The rotary pulse gear 7 is as shown by way of example in FIG. 1C, and is a gear having 60 teeth along its periphery in an embodiment of this invention. A pulse signal 105 at 60 pulses/revolution is provided through an amplifier 25.

Numeral 8 designates a phase reference pulse gear, which is shown in FIG. 1D. As its output signal, it generates a reference signal at 1 pulse/revolution. Shown at numeral 10 is an electromagnetic pickup, which provides a phase reference pulse signal 106 through an amplifier 26.

These signals 105 and 106 are applied to an analog-to-digital converter unit (A/D CU) 500. Digital signals sampled at a sampling frequency are applied to a CPU (central processing unit) through a bus line and are processed therein. The frequency analyzing system further includes a DMA (direct memory access) transmission interface I (FAC 100), a DMA interface (II) (FAC 102), a memory (I) (Program) which stores therein a program for frequency analysis, a memory (II) (Input data) which stores therein input data, a memory (III) (Analyzed data) which stores therein analyzed data, a CRT control electronics which is the interface with a display unit CRT K/B consisting of a keyboard and a cathode-ray tube, and a pulse counter which serves to set the diagnostic period of shaft vibrations.

The frequency analyzing program of the memory (I) uses, for example, the technique of FFT (fast Fourier transfer). Regarding the FFT, reference is had to, e.g., Japanese Laid-open Patent Application No. 47-1411 entitled "Fast Fourier transform data processor" (corresponding U.S. patent application Ser. No. 52332 filed July 6, 1970) which discloses a numerical problem solution employing the discrete Fourier transform. Since it is also described in detail to put the fast Fourier transform algorithm into the form of hardware, the FFT itself will be omitted from the description.

A practical application to the analysis of shaft vibration signals is described in U.S. Pat. No. 4,302,813 filed by the same applicant.

TABLE 1

| Explanation of Principal Symbols | |
|---|---|
| (LOGIC) | |
| DEC: | Decoder |
| SEL: | Selector |
| SCD: | Sampled Control Data |
| MAF: | Mode & Filter Select |
| ROM: | Read Only Memory |
| PLL: | Phase Locked Loop |
| CCD: | Channel Control Data |
| MPX: | Multiplexer |
| SdH: | Sampled Hold |
| PLL 100: | Synchronizing circuit module |
| ADC 100: | A/D converter circuit module |
| FAC 101: | Timing control circuit module |
| FAC 100: | DMA interface circuit module |
| LPF 100: | Active filter |
| CRT: | Cathode Ray Tube |
| Bus: | Bus line |
| CPU: | Central Processing Unit |
| (SIGNAL) | |
| RWSTB: | Read Write Strobe |
| RA: | Register Address |
| TMRCLK: | Timer Clock |
| ETRIG: | External Trigger |
| SPLCLK: | Sampling Clock |
| FS: | Filter Select |
| CRSTB: | Channel Read Strobe |
| CA: | Channel Address |
| Hold: | Sample Hold |
| CWSTB: | Channel Write Strobe |
| BUSY: | Busy |
| DB: | Data Bus |
| AC: | Analog Signal Channel |
| $T_d$: | Diagnostic period |
| $T_s$: | Sampling period ($= 1/f_s$) |

TABLE 1-continued

Explanation of Principal Symbols

- $T_a$: Analytical period
- $N$: Analytical sample number
- $k_R$: Analytical wave number
- $v(t)$: Shaft vibration signal
- $f_R$: Rotational frequency
- $f_a$: Analytical frequency ($f_{a(max)}$, $f_{a(min)}$)
- $f_c$: Cutoff frequency
- $f_d$: Specified frequency The outline of the frequency analysis in FIG. 1 will be described with reference to a flow chart in FIG. 2. In accordance with the processing procedure of the program stored in the memory (I), the CPU determines the diagnostic period $T_d$ in correspondence with a rotational frequency read from the pulse counter (FIG. 2, Step 2a). In Step 2b, a signal FS for selectively changing the time constant of a filter preventive of aliasing is obtained from the rotational frequency set in the pulse counter. When, in the frequency analysis of a vibrational waveform, a signal component outside an analytical band is superposed, an analytical error ascribable to the so-called aliasing develops. In order to eliminate the error, this invention resorts to an active low-pass filter (to be described in detail later).

In Step 2c, the following parameters which indicate the input conditions of the vibrational waveform are set into registers which are equipped in the A/D converter unit and the DMA interface (II). A data address (DA) is set in a data transmission address register equipped in the DMA interface (II) and a data count (DC) is set in a data transmission number register equipped in the same, though these registers are not shown in FIG. 1. A synchronization mode and filter selecting register, a sampling wave number register and a channel selecting register which are equipped in the A/D CU have a mode and filter select data (MAF), a sampling control data (SCD) and a channel control data (CCD) set therein, respectively.

In Step 2d, when the CPU requests data transmission, the A/D CU converts the vibrational waveform signal 101 into a digital signal at a timing which is determined by the pulse signal synchronous to the rotation 105 and the phase reference pulse signal 106, and it stores the resulting digital signal into the memory (II). The DMA interface (II) counts data transmitted, and upon end of the transmission of data equal in number to [sample number×channels], it stops the operation of the A/D CU and transmits an end interrupt signal to the CPU (Step 2e).

In Step 2f, upon the end of the data transmission, the frequency analysis is made in accordance with the FFT program of the memory (I). The result is stored into the memory (III), and can also be displayed on the CRT by means of the CRT control electronics.

While the analysis of the shaft vibration signals is executed in this manner, the characterizing features of the present invention reside in the A/D CU portion. Hereunder, the features will be described.

(1) Analytical frequency synchronization system (External synchronization system):

FIGS. 3A to 3D show the relationships between shaft vibration signal waveforms to be analyzed and samplings wherein $v(t)$ denotes the vibrational signal waveform to be analyzed, $T_s$ the sampling period, $f_s$ the sampling frequency, $N$ the number of analytical samples, and $n$ the analytical wave number. FIGS. 3(A) and 3(B) illustrate a prior-art method. Vibrational signals are sampled at the fixed sampling period $T_s$ ($=1/f_s$) irrespective of the frequency variation of the waveform to be analyzed. In FIG. 3(B), the rotational frequency is higher than in FIG. 3(A). Herein, since $T_s$=constant, the sample numbers per wave become unequal. When the sample number per wave has decreased as in FIG. 3(B), unfavorably the analytical precision degrades. When it is intended to secure a certain degree of analytical precision even in the case of FIG. 3(B), data are sampled more than are necessary in the case of FIG. 3(A). On the other hand, the sampling period cannot be made small unlimitedly on account of restrictions to the processing speed of hardware.

The first feature of this invention serves to solve the drawback described above. That is, as shown by way of example in FIGS. 3(C) and 3(D), data are sampled without changing the sample number per wave even when the rotational frequency has charged, in other words, the sampling period is changed depending upon the rotational frequency.

Further, in this invention, the analysis is performed continuously at the analytical period $T_a$ or intermittently each time an analyzing command is issued. In order to allow the same points of the analytical waveform to be sampled in all the analytical periods in that case if the rotational frequency is constant, phase synchronization is also effected. In, for example, FIG. 3(C), data are sampled so that the phasic relationship between $v(t)$ and the sampling frequency may become identical in all the periods $T_a$.

There will now be described how the frequency analysis is carried out to diagnose the state of a rotary machine during the rise of the rotational frequency, or in a short time (with a small number of data) at the fluctuation of the rotational frequency.

Hereunder will be described a case of synchronizing the analytical frequency and the sampling frequency with note taken of the fact that the shaft vibration phenomenon depends upon the rotational frequency $f_R$ being an exciting source and that important frequency factors in the diagnosis of the shaft vibration lie at frequency components equal to an integer times $f_R$ or to the inverse numbers thereof.

Now, the analytical frequency $f_a$ is represented as Expression (1) as a function of $f_R$:

$$f_a = [f_R/m_1, f_R/m_2 \ldots f_R/m_i, f_R, 2f_R \ldots, n_j f_R]^T \quad (1)$$

$$= [k_1, k_2, \ldots k_R, 2k_R, \ldots, n_j k_R \ldots]^T k_R^{-1} f_R$$

where $$k_R = L.C.M.(m_i) \quad (L.C.M. = \text{Least Common Multiple}) \quad (2)$$

$$k_i = k_R/m_i \quad (3)$$

On the other hand, the fundamental frequency $f_B$ of the DFT (discrete Fourier transform) is:

$$f_B = f_s/N \quad (4)$$

In order to synchronize $f_R$ and $f_B$, they are put:

$$f_R = k_R f_B \quad (5)$$

From Expressions (4) and (5), the sampling frequency $f_s$ becomes:

$$f_s = N.f_B = N.k_R^{-1}.f_R \tag{6}$$

Here, $k_R$ ($=f_R/f_B$) is the number of the rotational periods entering between the analytical periods and shall therefore be called the "wave number". That is, the following expression (7) is the fundamental expression of the analytical frequency synchronization system:

(Sampling frequency) = (Sample number/Wave number) × (Rotational frequency) (7)

Now, Expression (7) will be transformed in consideration of the ways of selecting the sample number N and the wave number $k_R$. From Expressions (2) and (6), the synchronization condition is given by Expression (8):

$$f_s = N \times L.C.M.(m_i)^{-1} \times f_R \tag{8}$$

Since the maximum value of the analytical frequency of Expression (1) is restricted by N and $f_B$, the band condition thereof is represented by Expression (9):

$$\text{Max}(n_j).f_R \leq 2^{-1}.N.f_B \tag{9}$$

From Expressions (6), (8) and (9), accordingly, the sample number N becomes:

$$N \geq 2 \cdot \text{Max}(n_j) \cdot f_R \cdot f_B^{-1} \tag{10}$$
$$= 2 \cdot \text{Max}(n_j) \cdot k_R$$
$$= 2 \cdot \text{Max}(n_j) \cdot L.C.M.(m_i)$$

Here, N is the power of 2 on the basis of the principle of the DFT and is therefore represented as Expression (11):

$$N = \{2 \cdot \text{Max}(n_j) \cdot L.C.M.(m_i)\} \tag{11}$$
$$= \{X\}$$

$\{X\}$ is that number of the power of 2 which satisfies Expression (12):

$$\{X\} = 2^n \geq X (n = 2, 3, 4, \ldots) \tag{12}$$

From Expressions (8) and (11), accordingly, the sampling frequency $f_s$ is given by Expression (13):

$$f_s = \{2.\text{Max}(n_j).L.C.M.(m_i)^{-1}.f_R \tag{13}$$

Assuming by way of example that the analytical frequency $f_a$ is:

$$f_a = [\tfrac{1}{4}, \tfrac{1}{3}, \tfrac{1}{2}, 1, 2, 3, 4] \cdot f_R, \text{ then:} \tag{14}$$

$$f_s = \{2 \cdot \text{Max}(1, 2, 3, 4) \cdot L.C.M.(4, 3, 2)\}$$
$$\cdot L.C.M.(4, 3, 2)^{-1} \cdot f_R$$
$$= \{2 \times 4 \times 12\} \cdot 12^{-1} \cdot f_R$$
$$= \{96\} \cdot 12^{-1} \cdot f_R = 2^7 \cdot 12^{-1} \cdot f_R$$
$$= 128/12 \cdot f_R$$

(2) Internal synchronization system:

In the shaft vibration phenomenon, when the rotational frequency is near ½ of the critical vibration frequency of the rotary member, an abnormal value is sometimes exhibited. In this case, the discrimination between fractional harmonic vibrations and the self-excited vibration becomes difficult. The discrimination, however, is important in the operation control and must be made by any method. In discriminating them without altering the rotational frequency, a method is considered in which the resolution is enhanced by increasing the sample number and the wave number of the frequency analysis. In actuality, however, it is the limit to enhance the resolution several times. Accordingly, an internal synchronization system for further enhancing the discriminating precision is proposed.

This is a system in which an internal synchronizing circuit is disposed and in which the sampling frequency is determined in synchronism with the critical vibration frequency inherent to the rotary member. It is supposed that the sampling frequency $f_s$ based on the internal synchronization system is given by Expression (15):

$$f_s = f_{10}.f_0 \tag{15}$$

Regarding the adjustment of the sampling frequency, it is assumed by way of example that the monitoring region of vibrations is 8 to 70 Hz and that the vibrations are monitored in unit of 0.1 Hz. Then, in Expression (15):

$$f_{10} = 80, 81, \ldots, 700 \text{ (corresponding to 8-70 Hz)} \tag{16}$$

$$f_0 = 0.1 \times \text{(sample number/wave number)} \tag{17}$$
$$= 0.1 \times (1024/60)$$
$$= 1.706 \text{ Hz}$$

The sampling frequency $f_s$ in the internal synchronization system is accordingly obtained in such a manner that the frequency equal to 1/10 of a value appointed by $f_{10}$ includes 60 waves at a sample number of 1024, 30 waves at a sample number of 512 and 15 waves at a sample number of 256.

Thus, it becomes possible to analyze the frequency component which is assigned by the internal synchronization system without depending upon $f_R$ unlike the case of Expression (14).

(3) Phase synchronization system for shaft vibration monitoring:

In order to grasp the factors of the shaft vibration, it is important to monitor the behavior of the phase of the vibration signal besides the monitoring of the vibration amplitude. In general, the strobe system etc. have been known. However, they have the disadvantages that a man is required for reading an angle mark and that the detection accuracy of the phase lowers when a waveform distortion has arisen.

According to this invention, even in case where a distortion has developed in the vibrational waveform, the phase synchronization can be made at high precision. That is, the absolute phase can be detected. This is useful, not only when the sampling of data is externally synchronized with $f_R$, but also when it is internally synchronized with the appointed frequency.

A high-frequency pulse signal whose frequency is synchronized with the sampling frequency $f_s$ generated by either the internal or external synchronization method is produced, and the data sampling is executed at the timing at which the AND condition among this high-frequency pulse, the rotational pulse and the reference phase pulse (1 pulse/rev.) have held.

PREFERRED EMBODIMENTS OF THE INVENTION

Now, concrete embodiments of this invention will be described. FIG. 4 shows an embodiment of the A/D CU 500 being the core of this invention, and is a diagram for explaining the outlines of the DMA transmission and the start control.

Referring to FIG. 4, the shaft vibration signals 101 are applied to an LPF 100 which includes two filters LPF$_1$ and LPF$_2$ having cutoff frequencies $f_c = 100$ Hz and 250 Hz respectively. The LPF$_1$ and LPF$_2$ are normally operating, and an output of either filter is selected by a filter selector circuit. The selected analog channel signals AC$_1$–AC$_{16}$ are applied to an A/D converter circuit ADC 100.

Here, the number of the input channels of the shaft vibration signals is made up to 16. Shaft vibration sensors are usually installed in a number of at most 12 in the tandem type. In the cross compound type, however, they are often divided into 2 channels, each of which includes 8 sensors. Therefore, the number of 16 has been set.

Figure 5:
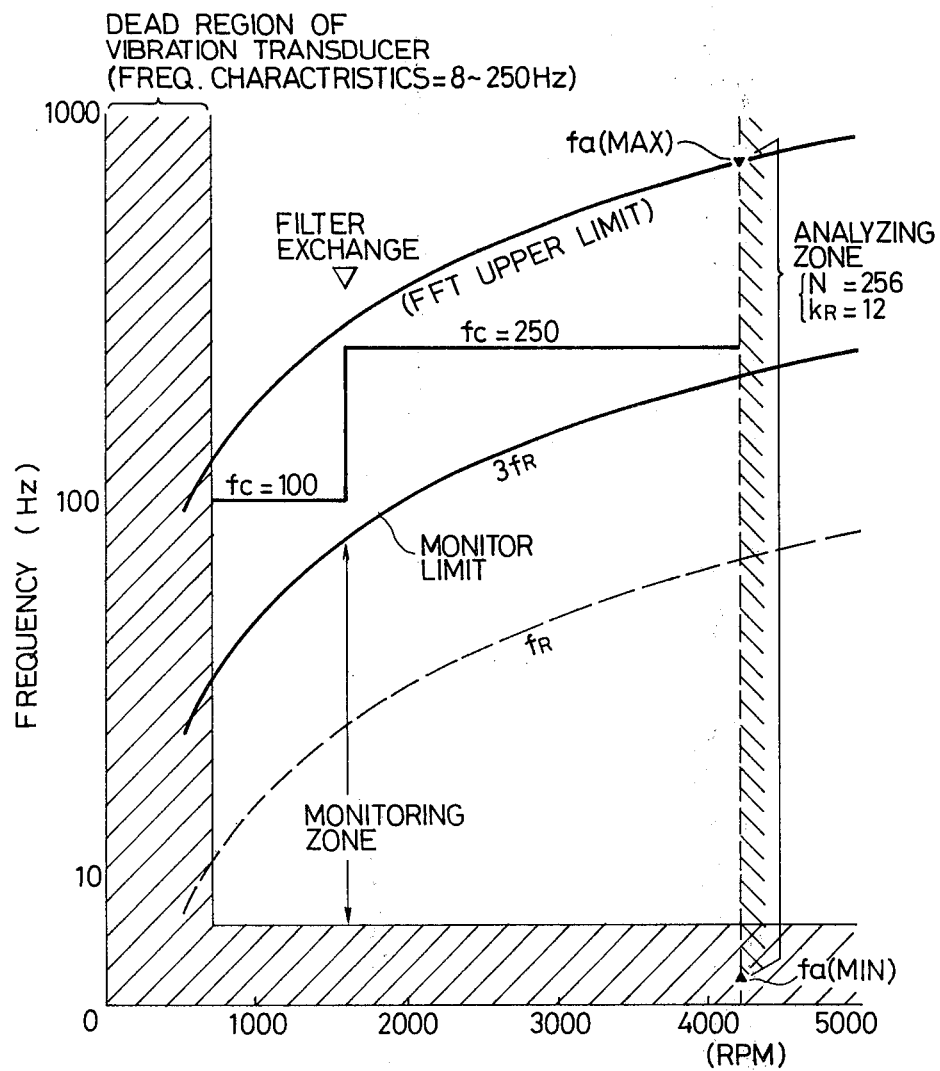
FIG. 5 shows the relationship between the cutoff frequency and analyzing zone of an active filter.

FIG. 5 shows the relationship between the cutoff frequencies of the active filters and the analyzing zone. At a rotational frequency of 1,600 r.p.m., the filter of $f_c = 100$ Hz is exchanged into the filter of $f_c = 250$ Hz. The upper limit of the frequency monitoring is 3 times higher than the rotational frequency, that is, it is depicted by a curve 3 $f_R$ in FIG. 5. In addition, there is the upper-limit value of the frequency analysis based on the FFT technique. The analysis can be performed for frequencies between $f_{a(max)}$ and $f_{a(min)}$. In a low rotational frequency region, an insensitive or dead region is inevitably existent in relation to frequency characteristics determined by the type of the vibration transducers 12, etc. In the example of FIG. 5, a region lower than 700 r.p.m. becomes the dead region.

Figure 6A:
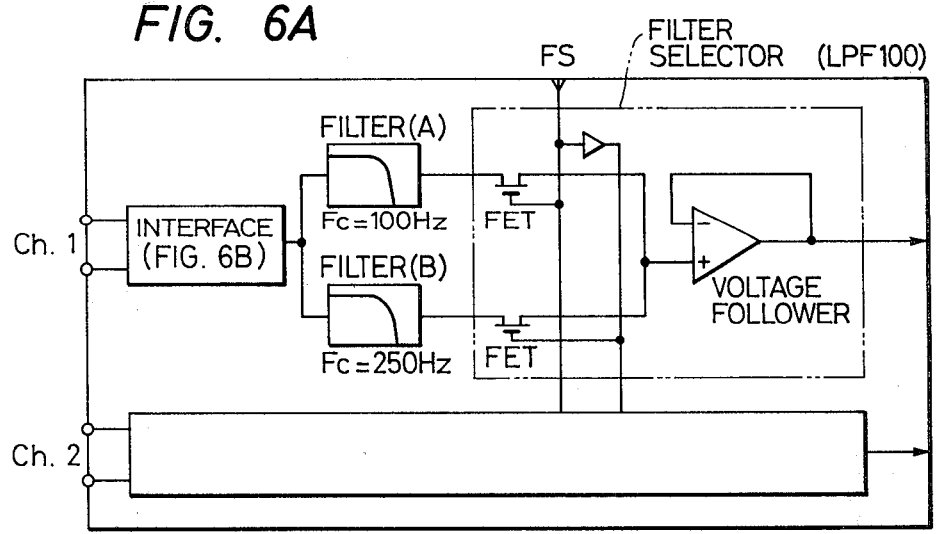
FIGS. 6A, 6B and 6C show examples of the arrangement of the active filter, an input interface, and a 7th order Butterworth filter circuit, respectively.
Figure 6B:
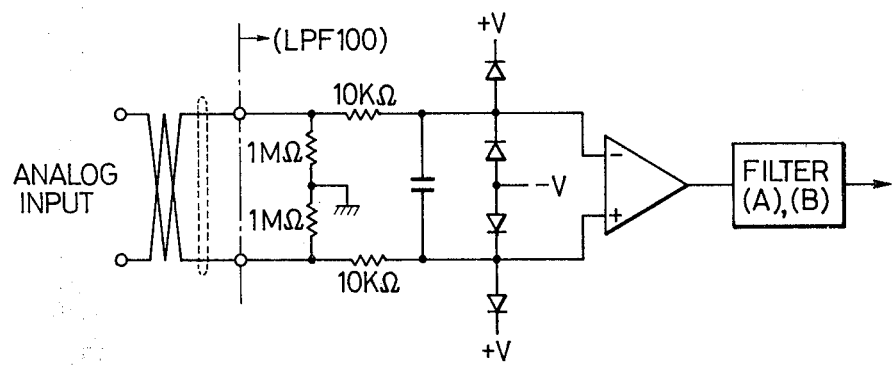
Figure 6C:
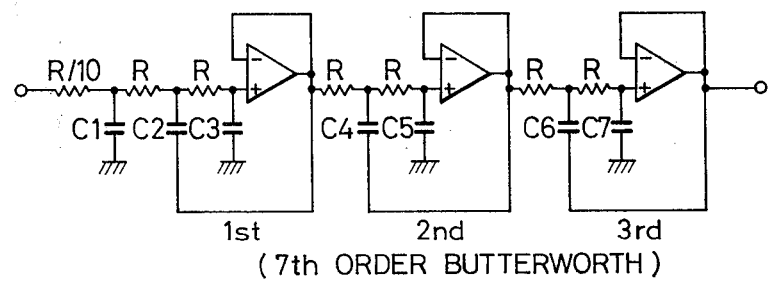

FIGS. 6A to 6C show a concrete example of the active low-pass filter. FIG. 6A shows the block arrangement of the LPF 100. FIG. 6B shows an example of an analog input interface circuit, while FIG. 6C shows an example of a 7th Butterworth low-pass filter circuit.

Table 2 sums up 4 modes classified in relation to the precision, the processing speed, etc. in the case where the sample number N and the analytical wave number $k_R$ have been appropriately set according to analyzing frequency regions. It is seen that $f_{a(max)}$ and $f_{a(min)}$ vary depending upon $k_R$ and N.

TABLE 2

| MODE | Content | $f_{a(min)}$ | $f_{a(max)}$ | $f_{a(max)}/f_{a(min)}$ | $f_R/f_{a(min)}$ | Analyzing zone |
|---|---|---|---|---|---|---|
| I | $\frac{N}{k_R}$ is const. $k_R$ is variable | inversely proportional to $k_R$ | proportional to rotational frequency | proportional to N | proportional to $k_R$ | 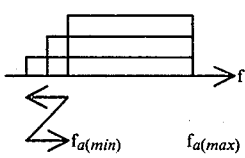 |
| II | only N is variable | proportional to rotational frequency | same as left | same as above | constant | 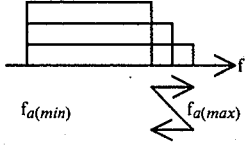 |
| III | only $k_R$ is variable | inversely proportional to $k_R$ | same as left | constant | inversely proportional to $k_R$ | 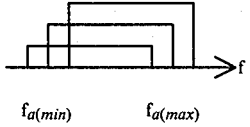 |
| IV | analytical harmonics $1/m_i$ and $n_j$ are variable | inversely proportional to L.C.M.$(m_i)$ | proportional to $\frac{Max(n_j)}{L.C.M.(m_i)}$ | proportional to Max$(n_j)$ | inversely proportional to L.C.M.$(m_i)$ | 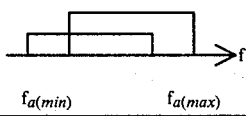 |

Mode I: high-precision and low-speed processing of low frequency region
Mode II: high-precision and low-speed processing of high frequency region
Mode III: low-speed processing of high- and low-frequency regions
Mode IV: processing of specified frequency region In the A/D converter portion ADC 100, the output signals AC$_0$–AC$_{15}$ of the LPF 100 are sampled and held in synchronism with a timing of "signal hold". Regarding the processings thus far described, all the channels (16) are processed in parallel.

Subsequently, a channel selector selects each channel in response to channel select signals CA$_0$–CA$_3$ and applies it to an A/D converter. The A/D converter operates to prepare digital vibrational data DB$_0$–DB$_{15}$ at a timing of an A/D conversion command signal CWSTB, and transmits them through the DMA interface FAC 100.

The PLL 100 receives the synchronizing pulse signal at 60 pulses/revolution and the phase pulse signal at 1 pulse/revolution, and generates by means of a PLL 1 and a PLL 2 rotation synchronous pulses, which are selected by a mode selector. Eventually, it provides a synchronizing pulse signal SPCLK. The circuit FAC 101 receives the signal SPCLK and an external trigger signal ETRIG from the PLL 100 and further a signal BUSY from the circuit FAC 100, and supplies the signals HOLD, $CA_0$-$CA_3$ and CWSTB to the circuit ADC 100 and a signal CRSTB to the circuit FAC 100. FIGS. 7A to 7J show a time chart of these signals. When it is desired to apply vibrational data from the CPU side to the FAC 100 by the DMA, a signal READ CONTROL in FIG. 7A (corresponding to the data input request signal in FIG. 2) is issued from the CPU. The FAC 100 generates the BUSY signal (FIG. 7C) indicating that the signal period is a DMA data transmission period until a signal END-P (FIG. 7B) is received from the CPU. Here, the signal END-P is issued as transmission end when the number of input data has reached [sampled number x channel number] in the DMA interface FAC 102 on the CPU side. The PLL 100 transmits the SPLCLK signal (FIG. 7F) to the FAC 101 in phase with the first ETRIG signal (FIG. 7D) after the BUSY signal has been received from the FAC 100. The FAC 101 delivers the HOLD signal (FIG. 7G) to the ADC 100, and the channel select signals $CA_0$-$CA_3$ (FIG. 7H) are provided after a delay of a setting time $T_{DH}$ which is determined from the characteristics of a sample and hold circuit equipped in the ADC 100. Although the details will not be discussed, the signals $CH_0$-$CH_{15}$ are successively changed-over with delays each being equal to the sum between the A/D conversion time and the DMA transmission time. After the signals $CA_0$-$CA_3$ have been provided, the DMA transmission command signal CRSTB (FIG. 7J) is provided for each channel with a delay of the A/D conversion time $T_{DA}$. However, the CRSTB signals are generated for only the channels selected by channel control data CCD to be described later. The CWSTB signal (channel write strobe signal) is generated with a further delay of a predetermined setting time $T_{DC}$ after $T_{DH}$.

Referring back to FIG. 4 for explaining the operation of the A/D CU during the start control, information of registers for various parameters as possessed by the A/D CU are transmitted from the CPU side onto data buses, and the kinds of the data at that time, in other words, register Nos. are applied to the FAC 100 by a signal FUN.

Upon receiving these signals, the FAC 100 generates timing signals RWSTB, register address signals $RA_0$--$RA_3$ and data signals $DB_0$-$DB_{15}$ to be written into the respective registers. The PLL 100 controls data bus gates of the equipped registers in accordance with contents decoded by a DEC and store the transmitted data into the respective registers at timings of the RWSTB signals.

Figure 8:
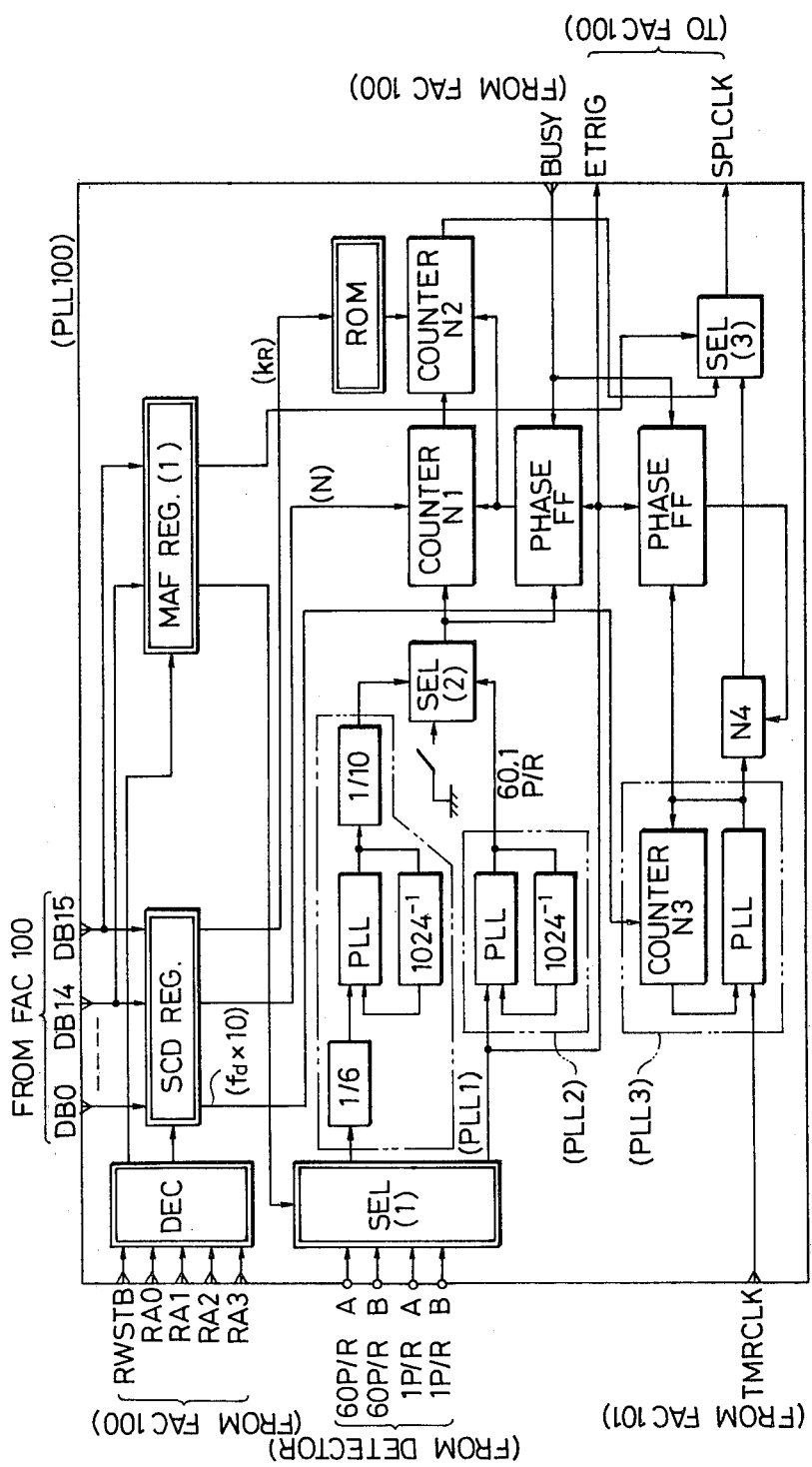
FIG. 8 shows a block diagram of a synchronizing circuit module (PLL 100).

Referring now to FIG. 8, the circuit PLL 100 will be described. Blocks SEL, DEC, SCD Reg., MAF Reg. (1), and ROM indicated by double frames are used for the start control, while the other blocks are used for the DMA transmission (the same applies to FIGS. 10 and 11).

<Operation during start control>

Prior to the transmission of vibrational waveform data by the DMA, parameter information are set in the respective registers of SCD and MAF Reg. (1) by the PCMA (program control memory access) system. The appointment of the SCD or MAF Reg. (1) is sensed on the basis of the fact that the signal RWSTB has been transmitted to the DEC and that the signals $RA_0$-$RA_3$ have been applied. Then, the gate control is performed to write the data $DB_0$-$DB_{15}$ into the corresponding registers. The data $DB_0$-$DB_{15}$ are transmitted from the CPU side and set as patterns of "1" and "0" as indicated in Table 3. In the SCD, 2 bits are used for changing-over the sample number N in the case of the rotation synchronization, and the succeeding 2 bits serves as a signal for changing-over the wave number $k_R$. $DB_4$ and $DB_5$ are idle bits, and $DB_6$ to $DB_{15}$ are parameters in the case of the internal synchronization.

TABLE 3

| SCD Reg. | | | | | | | | | | |
|---|---|---|---|---|---|---|---|---|---|---|
| DB 0 | 1 | 2 | 3 | 4 | 5 | 6 | 7 | 8 | 9 | DB 10 ... 15 |
| $N_1$ | | $N_2$ | | | | $N_3$ | | | | |
| $2^1$ | $2^0$ | $2^1$ | $2^0$ | | | $2^1$ ......... $2^0$ $N_3 = 79, 80, ..., 699$ | | | | |
| $N_1$ | | | | | | $N_2$ | | | | |
| $2^1$ | $2^0$ | Sample number N | | | | $2^1$ | $2^0$ | Wave number $k_R$ | | |
| 0 | 0 | 1024 | | | | 0 | 0 | 120 | | |
| 0 | 1 | 512 | | | | 0 | 1 | 60 | | |
| 1 | 0 | 256 | | | | 1 | 1 | 30 | | |
| 1 | 1 | — | | | | 1 | 1 | 12 | | |

In the MAF Reg. (1), only the upper 2 bits ($DB_0$, $DB_1$) are stored. This mode executes the change-over of the external synchronization pulses (channel A or channel B in FIG. 8), and the selection of the internal synchronization. The relations between bit pattern MOD and the synchronization modes are listed in Table 4. The bits are set in the synchronization selector as the SEL.

The exchange of the analog filters is made with $DB_2$, and the corresponding register is equipped in the FAC 101.

TABLE 4

| MAF Reg. (1) | | | | | | | | | | |
|---|---|---|---|---|---|---|---|---|---|---|
| DB 0 | 1 | 2 | 3 | 4 | 5 | 6 | 7 | 8 | 9 | DB 10 ... 15 |
| MOD | | | | | | | | | | |
| $2^1$ | $2^0$ | FS | | | | | | | | |
| MOD | | | | | | | | | | |
| $2^1$ | $2^0$ | Synchronization mode | | Remarks | | | | | | |
| 0 | 0 | External synchro A | | 1, 60 pulse(s)/revolution | | | | | | |
| 0 | 1 | External synchro B | | 1, 60 pulse(s)/revolution | | | | | | |
| 1 | 0 | Internal synchro | | frequency is variable* | | | | | | |
| 1 | 1 | Not defined yet | | — | | | | | | |
| | FS | Analog filter cutoff frequency | | | | | | | | |
| | 0 | 100 Hz | | | | | | | | |
| | 1 | 250 Hz | | | | | | | | |

*The frequency is set by $N_3$ in CCD.

<Operation during DMA transmission>

Let it be supposed that the signal of 60 pulses/revolution or 1 pulse/revolution has been selected by the SEL (1). The signal of 60 pulses/revolution has its frequency divided by 6 by means of a counter, the resultant signal is applied to a PLL (phase locked loop) circuit, the output signal of the PLL has its frequency divided by 1,024, and the resultant signal is fed back to the PLL, thereby to generate a signal synchronous with a signal of 10 pulses/revolution and at a frequency of 10,240 pulses/revolution. This signal has its frequency divided by 10, and the resultant signal is applied to a counter $N_1$ when it is selected so as to be synchronous with the signal of 60 pulses/revolution by means of a selector SEL (2) (manual selection is possible). The counter $N_1$ executes a frequency division corresponding to the sample number in accordance with the information of the upper 1st-2nd bits of the SCD register. Assuming by way of example that the sample number N=256, the frequency is divided by 4. A counter $N_2$ is selected to execute a frequency division in correspondence with the wave number previously set in the ROM. For example, when the wave number is 12, it is selected if the upper 3rd-4th bits of the SCD are "1" and "1". As stated above, the frequency of the sampling clock signal at, e.g., N=256 and $k_R=12$ is evaluated as follows:

$$[\text{frequency}]_{SPCLK} = [\text{frequency}]_{60 \ p./rev.} \times$$

$$\frac{1}{6} \times 1024 \times \frac{1}{10} \times \frac{1}{4} \times \frac{1}{12}$$

$$= [\text{frequency}]_{1 \ p./rev.} \times 256 \times \frac{1}{12}$$

$$= \text{rotational freq.} \times \text{sample number/wave number}$$

$$(= f_R \cdot N/k_R)$$

In the external synchronization at 1 pulse/revolution, the same circuit as described above except the frequency divisions by 6 and 10 (PLL 2) is used.

Figure 9:
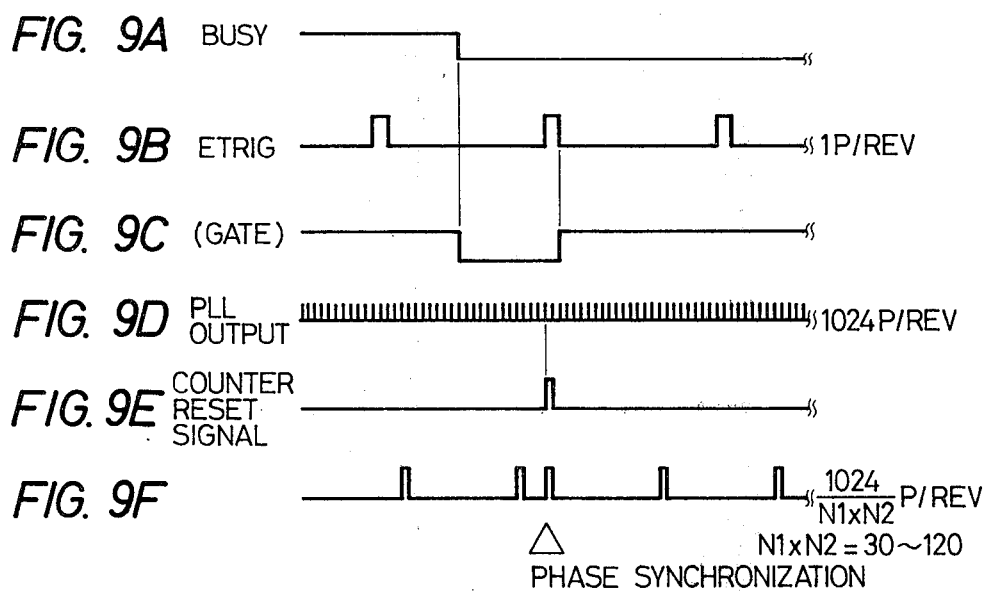
FIGS. 9A to 9F show a timing chart for explaining the phasing of the sampling clock signal.

In the internal synchronization, an output signal of a PLL 3 as obtained by multiplying a signal TMRCLK (generated by the FAC 101) by $N_3$ of the SCD (lower 10 bits) has its frequency divided by a counter $N_4$ (by 2,000), and $[\text{frequency}]_{SPCLK}$ is obtained as follows:

A signal GATE is formed in a section of [BUSY signal ↓] and [ETRIG∩], and a counter reset signal (FIG. 9E) is formed by [GATE]∧[ETRIG]∧[PLL output]. This reset signal is used to reset the counters $N_1$, $N_2$ and $N_4$ of the frequency divider circuits, and the counting is started at this time. Thus, the phase of the signal SPLCLK can be adjusted to the start point of the signal ETRIG (data input). This also signifies that the detection of the absolute phase of the vibrational waveform is possible.

Figure 10:
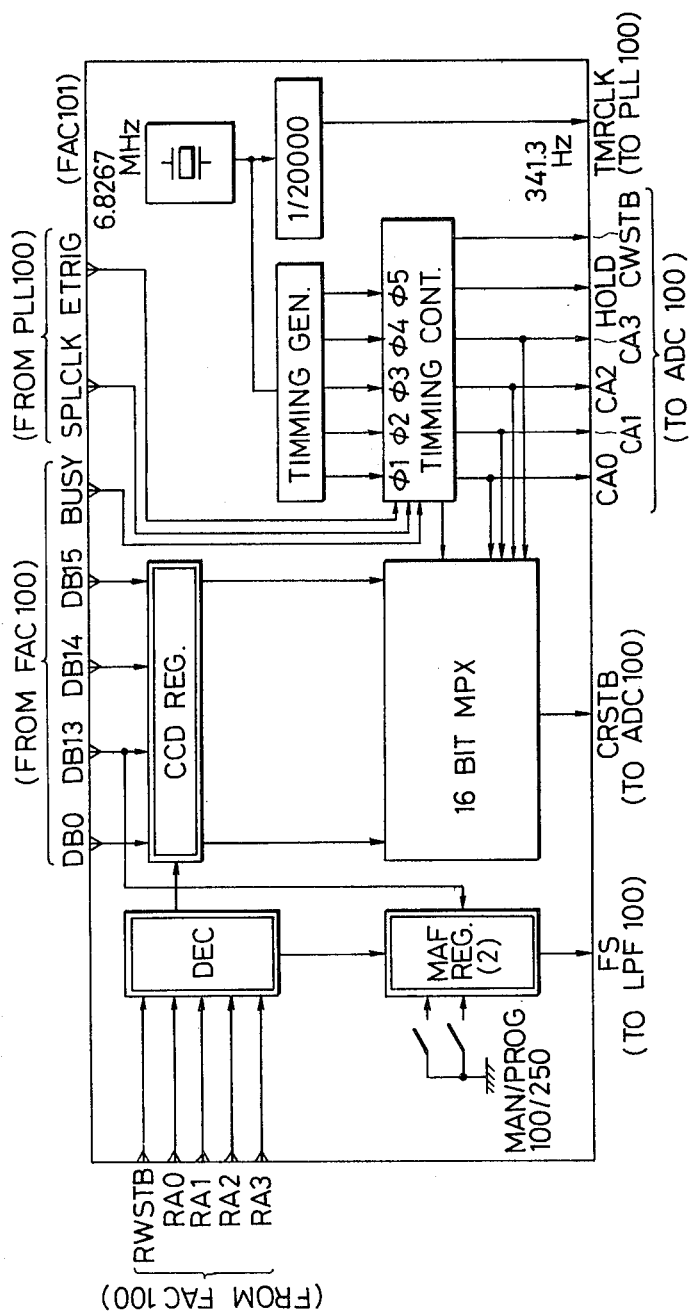
FIG. 10 shows a block diagram of a timing control circuit module (FAC 101).

Now, the FAC 101 will be described with reference to FIG. 10. First, the start control will be stated. In the presence of the signal RWSTB transmitted from the FAC 100, information $RA_0-RA_3$ indicative of register No. is decoded by a decoder DEC. When the MAF (2) Reg. or the CCD Reg. has been selected, its bus gate is controlled to load data into the corresponding register. As seen from Table 4, the MAF (2) Reg. generates the signal FS in accordance with the state ("1" or "0") of the bit $DB_2$. The signal is the analog filter exchange signal, and is applied to the LPF 100. The CCD register indicates and selects channel No. of the vibration signal on the basis of the relationship of a bit pattern shown in Table 5. Among channels Nos. 0 to 15, the bits of the channels desired to be analyzed have "1" set thereat, whereas the bits of the channels to which the analysis is not directed have "0" set thereat. This setting is executed by the CPU in accordance with a program stored in the memory (I) beforehand.

TABLE 5

| | | | | | | | CCD Reg. | | | | | | | | |
|---|---|---|---|---|---|---|---|---|---|---|---|---|---|---|---|
| DB 0 | 1 | 2 | 3 | 4 | 5 | 6 | 7 | 8 | 9 | 10 | 11 | 12 | 13 | 14 | DB 15 |
| CH 0 | CH 1 | CH 2 | CH 3 | | | | | | | | | | | CH 14 | CH 15 |
| Channels with "1" appointed - with DMA transmission | | | | | | | | | | | | | | | |
| Channels with "0" appointed - without DMA transmission | | | | | | | | | | | | | | | |
| Ex. 0 | 1 | 2 | 3 | 4 | 5 | 6 | 7 | 8 | 9 | 10 | 11 | 12 | 13 | 14 | 15 |
| 1 | 0 | 0 | 1 | 0 | 0 | 0 | 0 | 0 | 0 | 1 | 0 | 0 | 0 | 0 | 1 |
| Core address of transmission destination | +0 CH0 A/D conversion data<br>1 CH3 A/D conversion data<br>2 CH10 A/D conversion data<br>3 CH15 A/D conversion data<br>4 CH0<br>5 CH3<br>6 CH10<br><br>CH1<br>CH3<br>CH10<br>CH15 | 4 CH data<br><br><br><br><br>DMA transmission data<br>= 4 ch<br>× sample number<br><br>4 CH data | | | | | | | | | | | | | |

$$[\text{frequency}]_{SPCLK} = [\text{frequency}]_{TMRCLK} \times N_3 \times N_4 \ (1/2000)$$

$$= 0.1 \times N_3 \cdot \frac{1024}{60} \left( = \text{appointed freq.} \times \frac{N}{k_R} \right)$$

That is, the vibrational frequency component of 1/10 of the value set as $N_3$ is obtained in 60 harmonics at the sample number of 1,024. Here, the sample number shall be selected to 1,024 in the case of the internal synchronization.

Now, an operation for the fine adjustment of the phase of the signal SPLCLK will be described with reference to FIGS. 9A to 9F.

In the next place, an operation in the case of the DMA transmission will be described. An output signal CLK of a crystal oscillator C OSC (at 6.8267 MHz) has its frequency divided (by 20,000) to generate a signal TMRCLK. The signal TMRCLK is transmitted to the PLL 100 and becomes an input signal to the PLL (3) for the internal synchronization. On the other hand, various timing signals for controlling the ADC are prepared by a timing generator (constructed of a counter and a decoder). Pulse signals of phases different from one another as $\phi_1$, $\phi_2$, $\phi_3$, . . . are prepared from the signal CLK, and are transmitted to a timing control circuit. FIG. 11 shows the ADC 100.

Referring to FIGS. 12A to 12N and 12P, the operations of the timing control circuit and the MPX circuit will be described. The timing control circuit provides the signal HOLD (FIG. 12E) when the signal SPLCLK has been applied thereto. Supposing that among the signals of the different phases $\phi_1$–$\phi_4$, the pulse signal $\phi_1$ has first appeared (FIG. 12F) after the application of the signal SPLCLK, the channel change-over signals $CA_0$–$CA_3$ (FIGS. 12J–12M) are produced from this signal $\phi_1$. Subsequently, using the signal $\phi_2$ (FIG. 12G), the signal CWSTB (FIG. 12N) for the instruction of the timing of the A/D conversion is prepared. Subsequently, the signal $\phi_3$ (FIG. 12H) is applied to the MPX in order to prepare the DMA transmission instruction timing signal CRSTB (FIG. 12O). It is compared with the channel select pattern of the CCD register, and if the channel is selected, the signal CRSTB (FIG. 12P) is provided. The above operation is repeated for channels 0–15 in accordance with the patterns of the signals $CA_0$–$CA_3$, and upon end of the repeated processings, the provision of the HOLD signal is stopped (FIG. 12E). When the next SPLCLK signal has been transmitted, the above operation is repeated and is continued until the BUSY signal (FIG. 12A) disappears, that is, the DMA transmission of (sample number) x (channels) ends.

FIGS. 13A to 13D show an example of the shaft vibration input waveform. It is a hard copy of the result of the display of the applied waveform on the CRT (FIG. 1A). The example corresponds to a case where $f_R=2,815$ (r.p.m.) at an increased speed.

We claim:

1. A method of monitoring a shaft vibration of a rotary machine comprising the steps of:
   detecting the shaft vibration as a wave signal in proportion to a rotational frequency of the rotary machine;
   filtering the detected shaft vibration signal;
   sampling the filtered signal at a predetermined frequency, the predetermined frequency being selected by;
   (a) selecting the number of waves of the filtered signal to be included in an analyzing time interval determined by at least a minimum fractional harmonic of the rotational frequency which exists in a frequency range to be monitored,
   (b) selecting the number of samples to be sampled from the filtered signal in the analyzing time interval in accordance with a ratio of a maximum higher harmonic of the rotational frequency to the minimum fractional harmonic of the rotational frequency in the frequency range to be monitored, and
   (c) multiplying the rotational frequency by a ratio of the selected number of samples to the selected number of waves with the product thereof being the predetermined frequency; and
   analyzing the sampled data to obtain the vibration amplitude of frequency components within the frequency range to be monitored by digital processing so as to monitor the shaft of vibration state of the rotary machine.

2. A method of monitoring the shaft vibration of a rotary machine according to claim 1, further comprising the step of setting the ratio of the number of samples to the number of waves to be an integer value, and sampling in accordance with the set integer value.

3. A method of monitoring the shaft vibration of a rotary machine according to claim 1, wherein the step of selecting the number of samples includes setting the number of samples to be a power of 2.

4. A method of monitoring the shaft vibration of a rotary machine according to claim 1, wherein the step of filtering includes passing the shaft vibration signal through a low-pass analog filter having a cutoff frequency in a range greater than a maximum frequency of the rotational frequency to be analyzed and monitored and smaller than an analytical limit frequency.

5. An apparatus for monitoring a shaft vibration of a rotary machine comprising:
   shaft vibration transducer means for detecting shaft vibration and providing a shaft vibration signal;
   filtering means for filtering the shaft vibration signal;
   means for generating a present rotational phase signal which is a rotational phase reference signal of the rotating shaft of the rotary machine;
   means for generating a present synchronization pulse signal which is a predetermined number of pulses per revolution of the rotating shaft;
   synchronization means for receiving the synchronization pulse signal, the rotational phase reference signal and sample control data as input signals and for generating a sampling clock signal by effecting a phase synchronization in accordance with the rotational phase reference signal and the synchronization pulse signal during a starting-up period of the rotating shaft;
   timing signal generator means for receiving the sampling clock signal and the rotational phase reference signal as input signals and for generating a time control signal for sampling and holding;
   sampling means including analog-to-digital converter means responsive to the filtered shaft vibration signal and the time control signal for sampling the filtered shaft vibration signal at a predetermined frequency in accordance with the time control signal and for generating a digital signal in accordance therewith; and
   means for effecting a frequency analysis of the digital signal by digital signal processing so as to monitor the shaft vibration state of the rotary machine.

6. An apparatus for monitoring shaft vibration of a rotary machine according to claim 5, wherein the filtering means includes a low-pass filter having a cutoff frequency in a range greater than a maximum frequency of the rotational frequency to be analyzed and monitored and smaller than an analytical limit frequency, the sampling means being responsive to the output signal of the low-pass filter.

7. An apparatus for monitoring the shaft vibration of a rotary machine according to claim 5, wherein the synchronization means includes a first phase locked loop circuit for receiving the rotational phase reference signal and providing an output signal in accordance therewith, a second phase locked loop circuit for receiving one of the synchronous pulse signal and the rotational phase reference signal for providing an output signal in accordance therewith, and synchronization selection means for receiving the rotational phase reference signal and an output signal of one of the first and second phased locked loop circuit for providing a phase synchronization sampling clock signal in accordance with the rotational phase reference signal.

8. An apparatus for monitoring the shaft vibration of a rotary machine according to claim 5, wherein the synchronization means includes a register for storing sampled control data including an analytical sample number and an analytical wave number.

* * * * *